US012793448B2

(12) United States Patent
Hvidtfeldt et al.

(10) Patent No.: US 12,793,448 B2
(45) Date of Patent: Nov. 10, 2026

(54) IMAGE PROCESSING DURING BIOLOGICAL SAMPLE ANALYSIS

(71) Applicant: Radiometer Medical ApS, Brønshøj (DK)

(72) Inventors: Kristian Hvidtfeldt, Brønshøj (DK); Soren Rosenlund, Brønshøj (DK)

(73) Assignee: Radiometer Medical ApS, Brønshøj (DK)

( * ) Notice: Subject to any disclaimer, the term of this patent is extended or adjusted under 35 U.S.C. 154(b) by 326 days.

(21) Appl. No.: 18/556,151

(22) PCT Filed: Apr. 14, 2022

(86) PCT No.: PCT/EP2022/060081

§ 371 (c)(1),
(2) Date: Oct. 19, 2023

(87) PCT Pub. No.: WO2022/223455

PCT Pub. Date: Oct. 27, 2022

(65) Prior Publication Data

US 2024/0185624 A1 Jun. 6, 2024

(30) Foreign Application Priority Data

Apr. 20, 2021 (EP) .................................... 21169296

(51) Int. Cl.
*G06V 10/40* (2022.01)
*G06T 7/00* (2017.01)
*G06V 20/69* (2022.01)

(52) U.S. Cl.
CPC ............ *G06V 20/69* (2022.01); *G06T 7/0004* (2013.01); *G06T 7/0012* (2013.01); *G06V 10/40* (2022.01)

(58) Field of Classification Search
CPC ....... G06V 20/69; G06V 10/40; G06T 7/0012
See application file for complete search history.

(56) References Cited

U.S. PATENT DOCUMENTS 8,852,505 B2 * 10/2014 Dupoteau ............. B01F 29/321 422/68.1
2010/0027868 A1 * 2/2010 Kosaka ............. G01N 35/1016 382/134

(Continued)

FOREIGN PATENT DOCUMENTS

CA 3103447 A1 12/2020
WO WO 2020/027923 A1 6/2020

OTHER PUBLICATIONS

Regmi, H.K., Nesamony, J., Pappada, S.M. et al. A System for Real-Time Syringe Classification and Volume Measurement Using a Combination of Image Processing and ANNs. J Pharm Innov 14, 341-358 (2019). https://doi.org/10.1007/s12247-018-9358-5 (Year: 2019).*

(Continued)

*Primary Examiner* — Stephen R Koziol
*Assistant Examiner* — Ashley Hytrek
(74) *Attorney, Agent, or Firm* — FBT Gibbons LLP

(57) ABSTRACT

There is provided an image processing system. The system is configured to: receive at least one captured image depicting a) at least a portion of a collected biological sample, b) at least a portion of a container containing the biological sample, or both a) and b); process the received image to identify one or more characteristics of i) the biological sample, ii) the container, or both i) and ii); and output signals based on the identified one or more characteristics for result handling. The one or more characteristics comprise a pre-analytic sample condition of the biological sample.

13 Claims, 6 Drawing Sheets

(56) References Cited

U.S. PATENT DOCUMENTS

| | | | | |
|---|---|---|---|---|
| 2017/0290993 | A1* | 10/2017 | Cowan | A61M 5/365 |
| 2019/0224406 | A1* | 7/2019 | Tucker | A61M 5/145 |
| 2019/0360999 | A1* | 11/2019 | Sørensen | G01N 33/48792 |
| 2020/0365241 | A1* | 11/2020 | Evans | A61B 10/00 |
| 2021/0213486 | A1* | 7/2021 | Fradkin | G06T 7/97 |
| 2024/0169093 | A1* | 5/2024 | NarasimhaMurthy | G01N 35/00732 |

OTHER PUBLICATIONS

Regmi, Hem K. et al, "A System for Real-Time Syringe Classification and Volume Measurement Using a Combination of Image Processing and Artificial Neural Networks," Journal of Pharmaceutical Innovation, vol. 14, pp. 341-358 (2019).

International Search Report of International Application No. PCT/EP2022/060081, dated Aug. 10, 2022 (3 pages).

Written Opinion of the International Searching Authority for International Application No. PCT/EP2022/060081 (8 pages).

* cited by examiner

IMAGE PROCESSING DURING BIOLOGICAL SAMPLE ANALYSIS

This application is a national stage filing under 35 U.S.C. § 371 of International Application No. PCT/EP2022/060081, filed on Apr. 14, 2022, which claims priority to European Patent Application No. 21169296.7, filed on Apr. 20, 2021. The contents of each of these applications are incorporated herein by reference in their entirety.

FIELD OF THE INVENTION

The invention relates to image processing during biological sample analysis and handling the results of the image processing.

BACKGROUND

Analyzers for measuring physical parameters of analytes in biological samples, in particular blood samples, are widely used, especially in clinical settings. In addition to accuracy, precision, and reliability requirements, such analyzers are subject to further critical constraints, such as the time to obtain measurement results, the capability of providing reliable results from small sample volumes, as well as requirements in terms of low operating costs, low down times, ease of use, etc. The analysis and handling of biological samples therefore presents numerous and varied technical challenges. In particular, there is a need for improved methods and systems for detecting pre-analytical errors, mitigating risk during sample handling, and performing process control during sample analysis.

SUMMARY

These needs are met by the subject-matter of the independent claims. Optional features are set forth by the dependent claims and by the following description.

According to a first aspect, there is provided an image processing system. The system is configured to: receive at least one captured image depicting a) at least a portion of a collected biological sample, b) at least a portion of a container containing the biological sample, or both a) and b); process the received image to identify one or more characteristics of i) the biological sample, ii) the container, or both i) and ii); and output signals based on the identified one or more characteristics for result handling.

One possible use of the images involves the application of image processing to perform identification of the sample container and/or the biological sample contained therein. For example, the one or more characteristics may comprise a unique ID of the container. The image processing system may be configured to execute a barcode decoding algorithm to identify the unique ID via a two- or three-dimensional barcode on the container. Additionally or alternatively, the image processing system may be configured to execute an image recognition algorithm to identify the unique ID via a handwritten or printed label on the container, and/or to identify the unique ID via a biometric identifier on the container. Instead of or as well as using a dedicated unique identifier, the image processing system may be configured to identify a plurality of characteristics of the container which when combined uniquely identify the container.

Another possible use of the images involves the application of image processing techniques to determine the condition of the sample. For example, the one or more identified characteristics may comprise a pre-analytic sample condition of the sample. The step of processing the received image as described herein may comprise detecting one or more sample handling errors. More particularly, the step of processing the received image to identify the one or more characteristics (e.g., those comprising the pre-analytic sample condition of the biological sample) may comprise detecting one or more sample handling errors. Stated differently, the step of processing the received image to identify the one or more characteristics may comprise identifying a pre-analytic sample condition of the sample that may, for example, be indicative of one or more sample handling errors.

The one or more sample handling errors may comprise one or more operator errors. The one or more sample handling errors may comprise one or more test request errors. The one or more sample handling errors may comprise one or more patient identification errors. The one or more sample handling errors may comprise one or more patient preparation errors. The one or more sample handling errors may comprise one or more patient condition errors. The one or more sample handling errors may comprise one or more sample collection errors. The one or more sample handling errors may comprise one or more sample identification errors. The one or more sample handling errors may comprise one or more sample transportation errors. The one or more sample handling errors may comprise one or more sample storage errors. The one or more sample handling errors may comprise one or more sample preparation errors. The one or more sample handling errors may comprise a plurality of different types of sample handling error, such as the types identified herein. The terms "sample" and "specimen" may be used interchangeably in the present disclosure.

The sample handling error may transpire at any point during handling of the sample. For example, the sample handling error may transpire before or during input of the sample to the analyzer. More particularly, the sample handling error may transpire when the sample is being erroneously inserted/input into the analyzer, for example when a sample inlet of the analyzer is being erroneously operated. By "transpire" is meant that the error occurs, arises, or materializes, to the extent that it becomes detectable. Detection of the sample handling error may thus take place at any point after which the error has transpired. Detection of the sample handling error may be performed using any of the image processing techniques described herein, for example based on images captures using one or more appropriately positioned image capture devices.

The step of detecting the one or more sample handling errors may comprise detecting when one or more of: sample size is out-of-range; sample temperature is out-of-range; sample time stamp is out-of-range; and bubbles and/or clots are present in the sample.

In one sample condition example, the image processing system may be configured to execute an image recognition algorithm to determine an amount of the biological sample contained in the container. The image processing system may be configured to execute a decision making algorithm to determine whether the amount of the biological sample falls with a predetermined range acceptable for a biological sample analyzer. Various techniques for determining the amount of sample may be employed. For example, the image recognition algorithm may be further configured to recognize a position of one or more of a plunger, a shaft, and a piston of the container. In that case, the image processing system may be configured to determine the amount of the biological sample in the container based on the recognized position and on a known or recognized container type or cylinder diameter (i.e. the dimensions of the container are known such that the amount may readily be calculated or looked up based on the recognized position). Additionally or alternatively, in another sample condition example, the image processing system may be configured to execute an image recognition algorithm to identify visible sedimentation and/or air bubbles in the biological sample and optionally also an amount of the sedimentation and/or air bubbles. The image processing system may be configured to execute a decision making algorithm to determine whether the amount of sedimentation and/or air bubbles falls within an acceptable range. Additionally or alternatively, in yet another sample condition example, the image processing system is configured to execute an image recognition algorithm to determine a temperature of the biological sample and/or of the container. The image processing system may be configured to execute a decision making algorithm may be executed to determine whether the temperature of the biological sample and/or of the container falls within an acceptable range. Various techniques for determining the temperature may be employed. For example, the determination of the temperature and whether the temperature falls within the acceptable range may be made based on the recognition of a color of a temperature-sensitive color-changing element on the container.

In a further use case example, the one or more characteristics relate to sample history. In this case, the image processing system may be configured to execute an image recognition algorithm to obtain information regarding the sample history from an information carrier on the container. The information carried by the information carrier may simply comprise a timestamp. The information carrier may comprise an element having at least one property e.g. color which changes over time, to indicate for example the age of the sample and/or its transport time. The image processing system may be further configured to execute a decision making algorithm to determine whether the age and/or transport time falls within an acceptable range.

A further possible use of the images involves the application of image processing techniques to determine the condition of the container. In one container condition example, the image processing system is further configured to execute an image recognition algorithm to identify, via one or more geometric characteristics of the container, a type of the container. The image processing system may be further configured to execute a decision making algorithm to determine the presence or absence of a required type of container. Additionally or alternatively, in another container condition example, the image processing system is further configured to execute an image recognition algorithm to identify, via one or more geometric characteristics of the container, one or more components of the container, or one or more components for holding or transporting the container. The image processing system may be further configured to execute a decision making algorithm to determine the presence or absence of one or more required components. Additionally or alternatively, the decision making algorithm may then be executed to determine the presence or absence of one or more permissible or impermissible combinations of components. In a further container condition example, the image processing system is further configured to execute an image recognition algorithm to identify faults in the container and/or in one of its components. The image processing system may then be further configured to execute a decision making algorithm to select the appropriate action to be taken.

In a yet further use case, the result handling comprises performing gate control. In this case, the signals output by the image processing system based on the identified one or more characteristics may comprise signals for implementing the gate control at a biological sample analyzer. Any determination of the identity or condition of the sample and/or its container as described herein may be used to perform gate control.

In a still further use case, image processing techniques are applied to perform process monitoring and control at a biological sample analyzer. To this end, the image processing system may be configured to execute an image recognition algorithm to monitor one or more process or sample parameters during a process of analyzing the biological sample performed by a biological sample analyzer. In this case, the result handling comprises process control, and the signals output by the image processing system based on the identified one or more characteristics comprise signals for implementing process control at a biological sample analyzer. In one process monitoring example, the image processing system is configured to execute an image recognition algorithm to monitor a mixing process by recognizing movement of the container or of a component of the container in a series of captured images depicting the biological sample. In particular, the image recognition algorithm may be configured to detect a mixing anomaly by correlating the recognized movement to data defining movements or actuations of an agitator used during the mixing process. Various techniques for recognising movement of the container or components thereof are envisaged by the present disclosure. For example, the image recognition algorithm may be configured to recognize movement of the container or of the component of the container via a pattern on the container or component that visually shifts appearance when vibrating. Additionally or alternatively, in another process monitoring example, the image processing system is configured to execute an image recognition algorithm to detect detachment of the container from the sample handler or from any other container holder before or during the analysis, and/or to detect detachment of one or more components of the container from the container before or during the analysis. Additionally or alternatively, in a further process monitoring example, the image processing system is configured to execute an image recognition algorithm to detect inadvertent replacement of the container by comparing two or more captured images depicting the container before, during, or after the analysis, and recognizing one or more unique identifiers of the container in each image. Unique identifiers may be recognized in the manner described elsewhere herein. Additionally or alternatively, in a yet further process monitoring example, the image processing system is configured to execute an image recognition algorithm to detect shock applied to the container by comparing two or more captured images depicting the container before, during, or after the analysis, and recognizing a velocity and/or acceleration of movement of the container exceeding a predetermined threshold. In any of the process monitoring examples, the image processing system may configured to execute a decision making algorithm to apply one or more process monitoring rules and, based thereon, to generate the process control signals for use in controlling various processes, operations and functions of a biological sample analyzer.

According to a second aspect, there is provided a server comprising the image processing system of the first aspect.

According to a third aspect, there is provided a biological sample analyzer comprising the image processing system of the first aspect. The biological sample analyzer may further comprise one or more of: a sample handler; a measurement module configured to measure a parameter of the biological sample; a display configured to display the measured parameter of the biological sample; and an image capture device configured to capture the image. The biological sample analyzer may further comprise one or more elements for implementing gate control and/or process control. The biological sample analyzer may be a blood analyzer for analyzing a blood sample, or a blood gas analyzer for analyzing a blood sample, for example.

According to a fourth aspect, there is provided a biological sample handler comprising the image processing system of the first aspect. The biological sample handler may further comprising an image capture device configured to capture the image and/or one or more elements for implementing gate control and/or process control.

According to a fifth aspect, there is provided an image processing method comprising: receiving a captured image depicting a) at least a portion of a collected biological sample, b) at least a portion of a container containing the biological sample, or both a) and b); processing the received image to identify one or more characteristics of i) the biological sample, ii) the container, or both i) and ii); and outputting signals based on the identified one or more characteristics for result handling.

According to a sixth aspect, there is provided a computing device comprising a processor configured to perform the method of the fifth aspect.

According to a seventh aspect, there is provided a computer program product comprising instructions which, when executed by a computing device, cause the computing device to perform the method of the fifth aspect.

According to an eighth aspect, there is provided a computer-readable medium comprising instructions which, when executed by a computing device, cause the computing device to perform the method of the fifth aspect.

The invention may include one or more aspects, examples or features in isolation or combination whether or not specifically disclosed in that combination or in isolation. Any optional feature or sub-aspect of one of the above aspects applies as appropriate to any of the other aspects. These and other aspects of the invention will be apparent from and elucidated with reference to the embodiments described hereinafter.

BRIEF DESCRIPTION OF THE DRAWINGS

A detailed description will now be given, by way of example only, with reference to the accompanying drawings, in which:—

DETAILED DESCRIPTION

Figure 1:
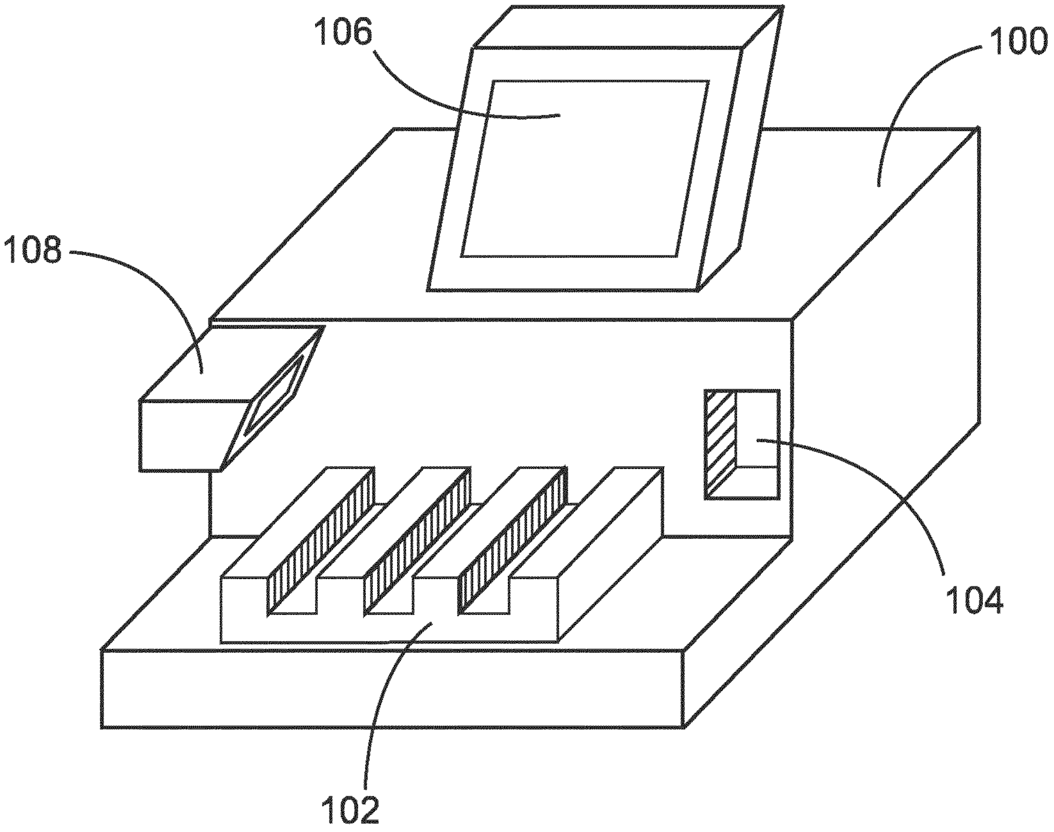
FIG. 1 illustrates a biological sample analyzer.

FIG. 1 illustrates one example of a biological sample analyzer 100. In this example, the analyzer 100 is a blood analyzer configured to provide measurements of one or more parameters for analyzing the blood of the subject, e.g. for establishing and/or monitoring a biological condition of the subject. Typically, the subject is a human patient but could equally be an animal. The analyzer 100 includes a sample handler 102 configured to hold sample containers prior to analysis of the samples contained therein and optionally to prepare the samples for the analysis, for example by mixing them. The sample handler 102 may comprise an automated sample delivery mechanism (not shown) for automatically delivering samples to a sample inlet port 104 of the analyzer 100. To this end, the sample delivery mechanism may comprise one or more actuators to effect lateral movement of the sample handler 102 and introduction (e.g. aspiration) of the sample to the sample inlet port 104. Alternatively, samples may be manually introduced to the sample inlet port 104. The sample handler 102 in the non-limiting example shown holds up to three syringes, but it will be appreciated that other numbers and forms of sample container may be held. A touchscreen 106 is provided for user operation of the biological sample analyzer 100 and for presenting results of the analysis. The touchscreen 106 may also display results of the image processing as described herein. It will be appreciated that other forms of user interface may be used in addition to or instead of the touchscreen 106. An image capturing unit 108 is positioned to overlook both the sample handler 102 and inlet port 104.

Figure 2:
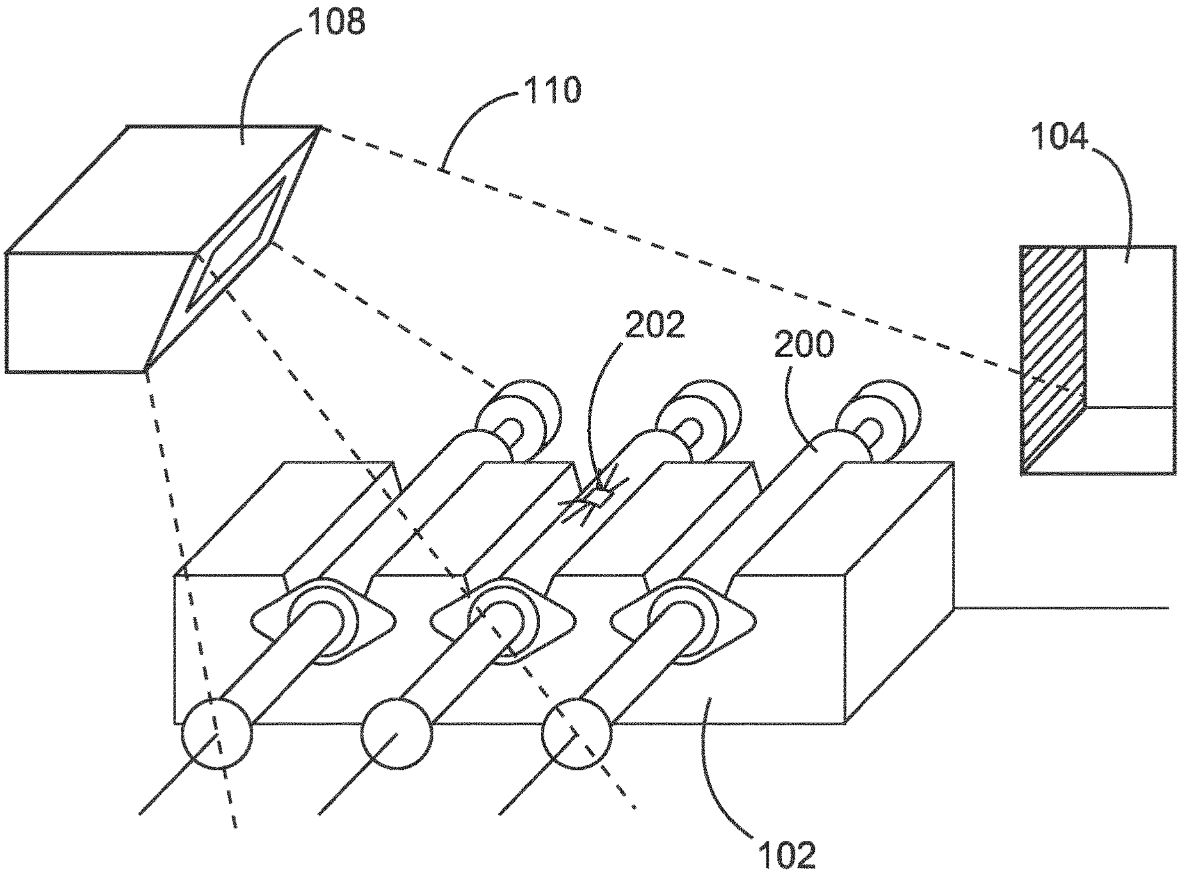
FIG. 2 illustrates the capturing of images by an image capturing unit of the biological sample analyzer of FIG. 1.

FIG. 2 shows the positioning of the image capturing unit 108 in more detail. In the non-limiting example shown, the image capturing unit 108 is positioned such that its field of view 110 encompasses syringes 200 held by the sample handler 102, as well as any syringe and/or sample that may be manually brought to the sample inlet port 104. The syringes 200 may comprise information carriers 202 (described further below), which also fall within the field of view 110. In this example, the syringes are at least partly translucent, such that the images depicting the syringes 200 furthermore depict at least part of the samples contained by those syringes 200. It will be understood that the image capturing unit 108 may instead be positioned to capture images at other locations of the samples and/containers, for example within the analyzer 100, for example during the analysis. Multiple such image capturing units may be provided to capture images at various locations and stages of the analysis both inside and outside of the analyzer 100. For example, images may be captured using image capturing units attached to any equipment used in collecting, transporting, handling, storing, or processing the samples prior to or during the analysis by the analyzer 100. In any case, the image capturing unit 108 is positioned such that it captures an image depicting at least a portion of a collected biological sample, and/or at least a portion of the container containing that sample.

Figure 3:
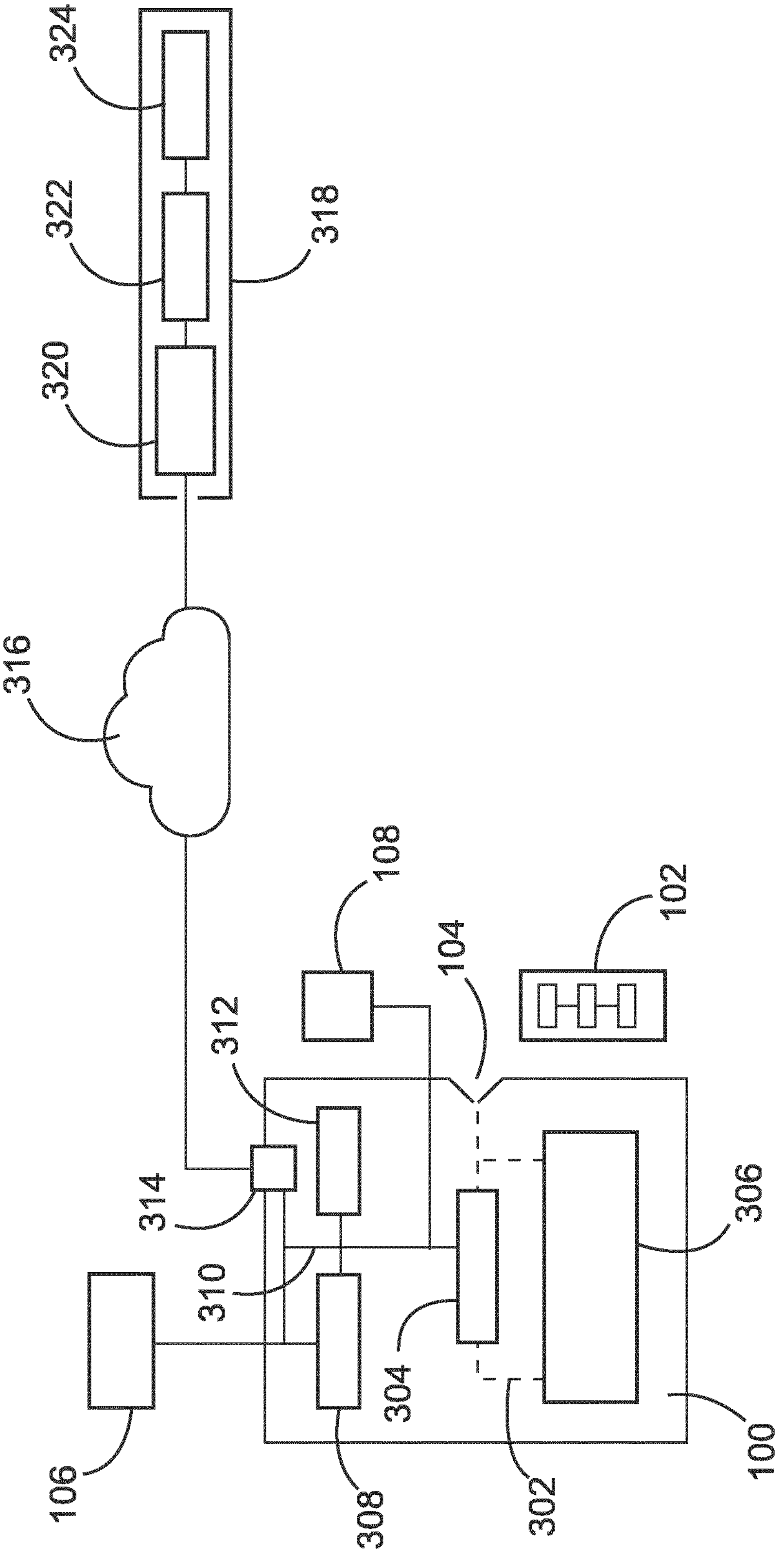
FIG. 3 is a schematic diagram of the biological sample analyzer of FIG. 1.

FIG. 3 shows a block diagram of the analyzer 100. The analyzer 100 comprises a conduit 302 fluidically connecting the sample inlet port 104 to a measurement module 304. The conduit 302 furthermore provides bidirectional fluidic communication between the measurement module 304 and a consumables module 306. The measurement module 304 is communicatively coupled to a system bus 310, to which the touchscreen 106 and the image capturing unit 108 along with an image processing system 312 and a communications interface 314 are also communicatively coupled. The communications interface 314 is configured to communicate via any suitable wired or wireless computer network 316 with a remote computing device 318, which in turn comprises its own communications interface 320 along with a processor 322 and a display 324. The remote computing device 318 may comprise a mobile device, a (cloud) server, or a HIS/LIS system, for example.

In use, samples are delivered by the sample handler 102 to the sample inlet port 104 and are conveyed from there along the conduit 302 into operational interaction with the measurement module 304. Consumables used for the analysis are conveyed from the consumables module 306 to the measurement module 304 via the conduit 302. A sample handling infrastructure (not shown) comprising one or more pumps and/or valves may be provided for conveying the samples along the conduit 302. The measurement module 304 provides measurements on analyte parameters in the samples. A sensor assembly design that is suitable for simultaneously measuring a plurality of different parameters in bodily fluids, particularly in whole blood, and its use in a blood analyzer, is found in e.g. EP 2 147 307 B1. The parameters may comprise e.g. the partial pressure of one or more blood gasses in a whole blood sample of the subject, concentrations of one or more electrolytes and/or metabolites in the blood sample, and/or the hematocrit value of the blood sample. For example, one or more of the following parameters may be measured: p CO2, p O2, p H, Na+, K+, Ca2+, Cl−, Mg2+ glucose, lactate, creatinine, urea and hemoglobin and hemoglobin-derivate values, as these parameters are important clinical indications in assessing the condition of a medical patient. It will nonetheless be appreciated that, in other embodiments, the analyzer 100 may be for analyzing other types of biological samples. The measurement module 304 generates signals that are representative of the parameters and provides the signals to the control unit 308. The control unit 308 processes the received signals and presents the processed signals as output to a user via the touchscreen 106, and/or forwards the processed signals to the remote computing device 318 for further processing and/or display. After measurement, waste is discharged from the measurement module 304 into a waste reservoir of the consumables module 306 via the conduit 302 and the measurement module 304 is prepared for the next measurement. Throughout the procedure, the control unit 308 generates and outputs control signals for controlling operation of the analyzer 100. In particular, the control unit 318 instructs the image capturing unit 308 to capture images of the syringes 200 prior to and/or during delivery of the samples to the sample inlet port 104 and to provide the captured images to the image processing system 312 for image processing.

Figure 4:
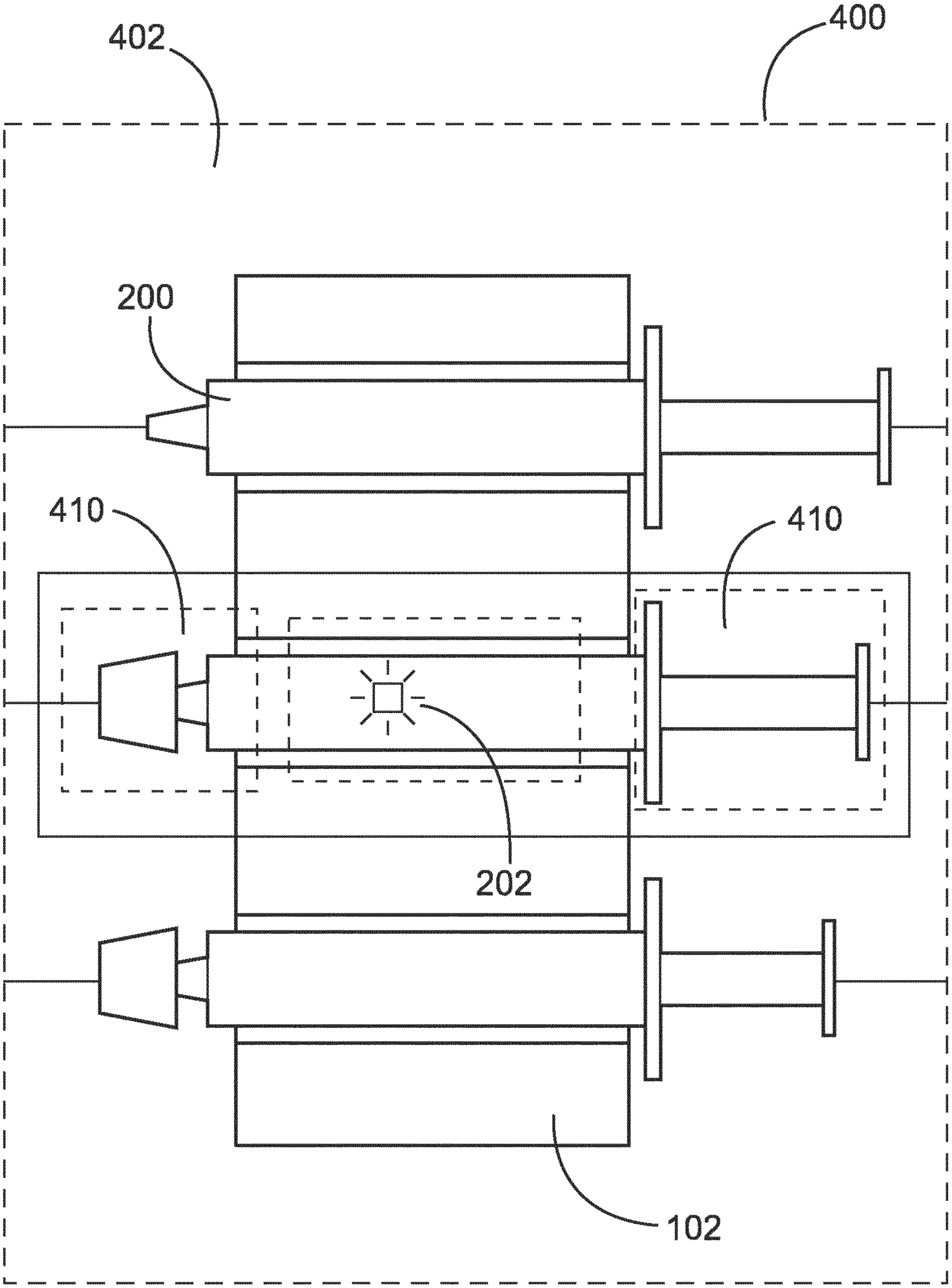
FIG. 4 shows an image captured by an image capturing unit of the biological sample analyzer of FIG. 1.

FIG. 4 shows such an image 400 captured by the image capturing unit 108. The image 400 has a border 402 corresponding to the limits of the field of view 110 and shows the syringes 200 along with the biological samples contained therein and the information carriers 202. Exemplary characteristics 410 of the syringes 200 which may be recognised during image processing are highlighted in FIG. 4, relating in this example to a type of the syringe 200 and its plunger position. A fuller discussion regarding the characteristics of biological samples and their containers which may be recognised according to the present disclosure is provided below. The content of FIG. 4 is not to be understood as being limiting in this sense.

Figure 5:
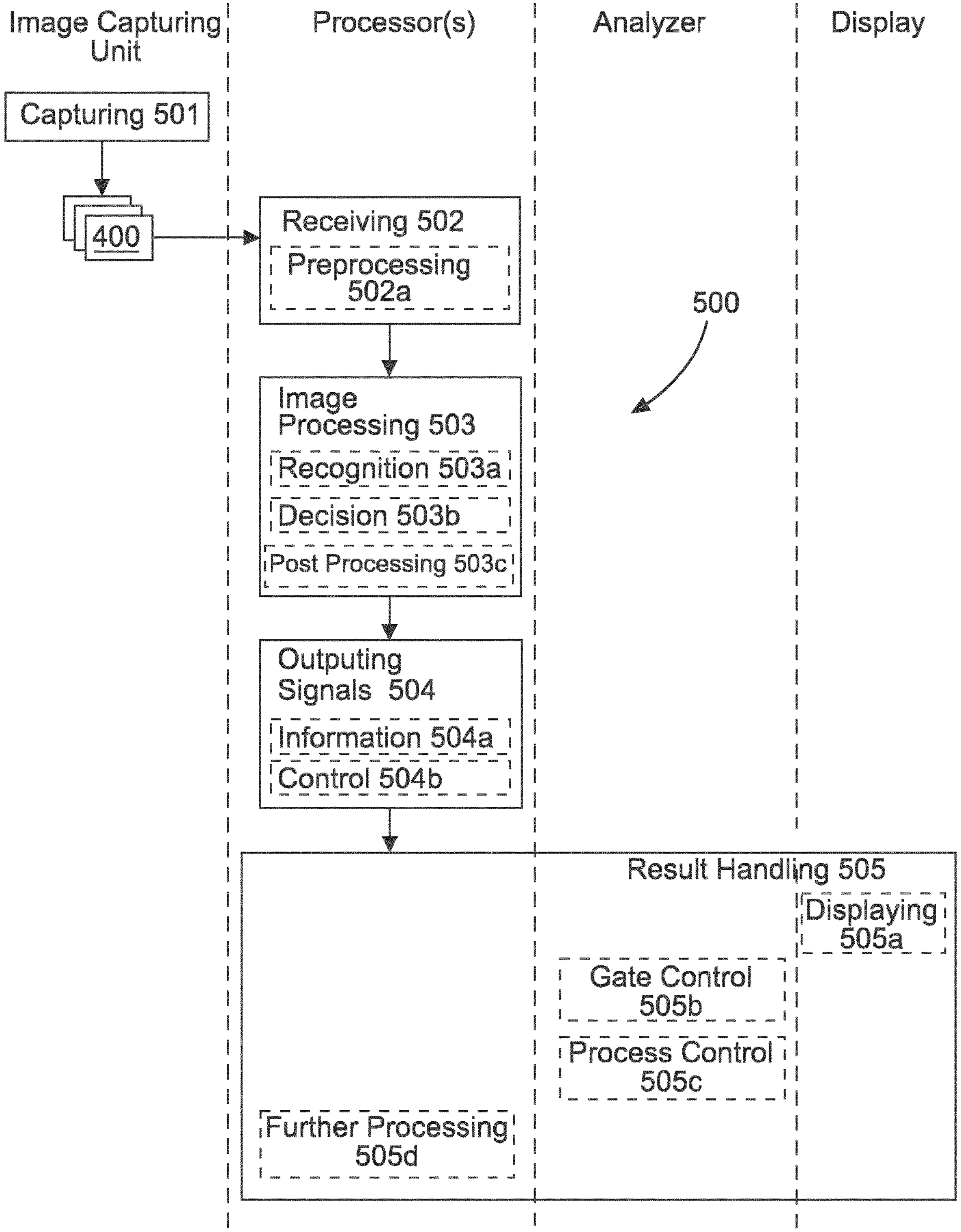
FIG. 5 is a flowchart representing a method for capturing and processing images during biological sample analysis and handling the results of the image processing.

FIG. 5 is a flowchart showing a method 500 for capturing and processing images during biological sample analysis and handling the results of the image processing.

In step 501, one or more images 400 depicting at least a portion of a collected biological sample and/or at least a portion of a container 200 containing the biological sample are captured. Step 501 may be performed for example by the image capturing unit 108 positioned as shown in FIGS. 1 and 2, by another image capturing unit positioned elsewhere, as described above, or by any combination thereof.

In step 502, the captured one or more images 400 are received and optionally preprocessed (in step 502*a*) to prepare them for the following image processing step. For example, any one or more image filtering techniques (e.g. noise reduction, sharpening, color filtering), transformation techniques (e.g. affine transformations, cropping), or image segmentation techniques (e.g. to detect and isolate regions of interest) may be performed to prepare the images, as is known in the art.

In step 503, image processing is performed on the received and optionally preprocessed one or more images 400 to identify one or more characteristics of i) the biological sample, ii) the container 200, or both i) and ii). For example, the exemplary characteristics 410 of the syringes 200 shown in FIG. 4 may be identified during the image processing. However, numerous forms which the image processing can take are envisaged by the present disclosure, as elucidated below.

In step 503*a*, one or more image recognition techniques or algorithms may be used to identify the characteristics in step 503*a*. The image recognition algorithms may perform any one or more appropriate techniques including feature extraction of features such as extracting lines, edges and ridges, localized regions of interest, and complex features such as texture, shape or motion, detection/segmentation techniques, and pose estimation in relation to relative positions of components e.g. those of the container. Further examples will be apparent to the person skilled in the art.

In step 503*b*, one or more decision making algorithms may be used to decide what action is to be taken on the basis of the identified characteristics. By "decision making algorithm" is meant any algorithm or other computational technique for interpreting the identified characteristics and/or determining whether certain conditions or requirements are met, whether those are qualitative or quantitative such as thresholds and ranges, and for deciding what action is to be taken. The decision making algorithm may comprise for example one or more of a rule-based algorithm, a heuristic algorithm, a computation algorithm. Decisions may include for example pass/fail, match/no-match, or flag for human review.

Any of the algorithms described herein may comprise conventional or computation algorithms, trained machine-learning models such as classification algorithms, or any combination thereof.

In step 503*c*, postprocessing may optionally be performed on the processed images, for example to highlight the identified characteristics or annotate the images with a textual description of the identified characteristics, in the case that output of the image processing is to be displayed to a user.

In step 504, one or more signals based on the identified one or more characteristics are output for result handling. The signals based on the identified one or more characteristics may comprise signals conveying the identified characteristics as information (which are output in step 504*a*) and/or control signals derived from the identified characteristics (which are output in step 504*b*). A decision as to which signals are to be output may be made for example by the decision making algorithm. For example, the decision making algorithm may decide whether the identified characteristics are to be displayed to the user in some form (and if so, in which form) and/or whether the identified characteristics are to be used to derive control signals for controlling operations of e.g. the analyzer, as described further below.

In step 505, result handling is performed using the signals output in step 504.

For example, in step 505*a*, the result handling may comprise displaying the identified characteristics to a user via a display, for example the touchscreen 106 and/or the display 324 of the remote computing device 318. In this case, the signals output in step 504 may comprise signals conveying the identified characteristics for display. The identified characteristics may be conveyed for example in textual or graphic form, such as an annotated or modified image highlighting the characteristics.

Additionally or alternatively, the result handling may comprise, in step 505*b*, performing gate control at the analyzer 100, with the signals output by the image processing system 318 comprising gate control signals which convey instructions to the analyzer (i.e. to its control unit 308) that a yet-to-be-started analysis is to be prevented. For example, the gate control signals may be used by the analyzer 100 for one or more of the following: preventing the analysis in software and/or hardware such as by using interrupt signals; instructing actuators to physically lock out or eject the container 200; generating alarms (visible, audible, and/or haptic) for a user. The signals for implementing gate control may thus be directly usable or transformable by the control unit 308 for generating control signals for controlling various processes, operations and functions of the analyzer 100.

Additionally or alternatively, the result handling may comprise, in step 505*c*, performing process control at the analyzer 100, with the signals output by the image processing system 318 comprising process control signals which convey instructions to the analyzer (i.e. to its control unit 308) that a running analysis is to be regulated, suspended (e.g. pending user action), or aborted entirely. For example, the process control signals may convey instructions to the control unit 308 that the sample is to be discharged as waste to the waste reservoir of the consumables module 306. Further process control signals may convey instructions to the control unit 308 to control heating or cooling elements, mixers or agitators, pumps, and valves used in the analysis.

Additionally or alternatively, the result handling may comprise, in step 505*d*, further processing. Further processing may comprise, for example, alerting the image capturing unit 308 and/or the user that further images and/or better quality images are required before a decision can be taken.

Any of steps 502-504 (including any of their individual substeps) and 505*d* can be performed by any one or more suitable processors, in particular by the image processing system 312, but also by the control unit 308, the processor 322 of the remote computing device 318 (e.g. a cloud server), or any combination thereof. Processing may be distributed among multiple processors. Equally, although some units are shown as being separate components, they may form part of the same component. For example, the functions of the control unit 308 and image processing system 312 may be performed by a single processor.

It will be appreciated from the above that the method may be performed by a single unit (e.g. the analyzer) or by multiple units working together. There is thus envisaged by the present disclosure a distributed system for performing the method comprising one or more of the image capturing unit, one or more processors, an analyzer, and a display.

There now follows a more detailed description of the various ways in which the image processing 503 according to the present disclosure may be performed.

One possible use of the images 400 involves the application of image processing to perform identification of the sample container 200 and/or the biological sample contained therein. For example, the one or more characteristics comprise a unique ID of the container 200. A barcode decoding algorithm may be executed to identify the unique ID via a one-, two-, or three-dimensional barcode on the container 200. Additionally or alternatively, an image recognition algorithm may be executed to identify the unique ID via a handwritten or printed label on the container 200, and/or to identify the unique ID via a biometric identifier on the container 200. Instead of or as well as using a single unique identifier, the image processing may comprise identifying a plurality of characteristics of the container 200 which when combined uniquely identify the container 200.

Another possible use of the images 400 involves the application of image processing techniques to determine the condition of the sample. For example, the one or more identified characteristics may comprise a pre-analytic sample condition of the sample.

Additionally or alternatively, one or more sample handling errors performed by an operator before, or in association with, handling a biological sample and/or inputting it to an analyzer may result in a pre-analytical sample condition of the sample. The one or more sample handling errors may result in inferior analysis of the sample (e.g., one or more of: reduced accuracy of the analysis result, invalid analysis result, and lack of analysis result—for example, due to interrupted sample processing). Thus, controlling (preferably minimizing, or at least reducing) the occurrence of sample handling errors is desirable.

Such control may be particularly difficult in a point-of-care (POC) environment where the circumstances for proper sample handling may be inferior (e.g., in terms of parameters such as temperature, lighting, sanitation, etc.), and/or where numerous different operators (possibly with varying experience and/or professional role) may have access to the analyzer.

Accordingly, the step of processing the received image as described herein may, for example, comprise identifying characteristics that comprise a pre-analytic sample condition of the sample that may, for example, be indicative of one or more sample handling errors. Generally, when a sample handling error is referred to herein, it is meant to encompass any possible sample handling error. Typically, a sample handling error is an error which is likely to have been caused by an operator (e.g., a pre-analytical error). For example, a sample handling error may be caused by an operator by mistake, due to lack of experience, due to lack of training, or on purpose. A sample handling error may be caused by the operator before, or in association with, handling the biological sample and/or inputting it to the analyzer.

Some example types of pre-analytical errors and possible sources thereof are tabulated below.

| Types of pre-analytical error | Possible sources |
|---|---|
| Test request | Erroneous request, inappropriate request |
| Patient identification | Wrong identification, missing identification |

-continued

| Types of pre-analytical error | Possible sources |
|---|---|
| Patient preparation and condition | Biological variables, diet, fasting |
| Time of sample collection | Diurnal, fasting, peak and trough |
| Sample collection and identification | Mislabeled, unlabeled, hemolysis, incorrect order of draw, wrong tube type, wrong anticoagulant, IV line (contamination from infusion), tourniquet time, posture, fist clenching, traumatic draw, insufficient or vigorous tube mixing, quantity not sufficient, clot |
| Sample transportation | Length and environmental conditions, excessive transportation time, temperature, pneumatic tube system |
| Sample storage | Improper storage, length of time, temperature, evaporation, freezing and thawing |
| Sample preparation | Delayed processing, aliquoting, centrifugation conditions |

A sample handling error including faulty execution when handling and/or inputting the sample to the analyzer may be detected, in the manner described herein based on processing captured images, for example due to a sample inlet being erroneously operated (e.g., not being closed) and/or due to the sample being erroneously inserted (e.g., improper orientation of a sample holder, or sample missing).

A sample handling error including improper management of the sample before inputting the sample to the analyzer (e.g., keeping it at the wrong temperature, shaking it too much or too little, extracting a too small amount of it from the patient, or letting too much time pass between the extraction from the patient and insertion into the analyzer) may, for example, be detected due to one or more of: sample size is out-of-range, sample temperature is out-of-range, bubbles and/or clots are present in the sample, and sample time stamp is out-of-range. The term out-of-range generally refers to a parameter value falling below or above a range of acceptable values for the parameter.

The term "operator" as used herein is meant to encompass any suitable person interacting with the analyzer. Example operators include: physicians, nurses, assisting nurses, caregiving assistants, laboratory technicians, and laboratory assistants. In fact, even patients and their relatives (or other non-medically trained personnel) may be considered as operators when the analyzer is configured for self-care.

References herein to sample handling errors being detected by, at, or in the analyzer are to be understood as including such detection in relation to other devices such as the sample handler or any device performing the image processing as described herein.

In one sample condition example, an image recognition algorithm may be executed to determine an amount of the biological sample contained in the container 200. The decision making algorithm may be executed to determine whether the amount of the biological sample falls with a predetermined range acceptable for the analyzer 100. Various techniques for determining the amount of sample may be employed, for example, the image recognition algorithm may be configured to recognize a position of one or more of a plunger, a shaft, and a piston of the container 200, wherein the amount of the biological sample in the container 200 is determined based on the recognized position and on a known or recognized container type or cylinder diameter.

In another sample condition example, an image recognition algorithm may be executed to identify visible sedimentation and/or air bubbles in the biological sample and optionally also an amount of the sedimentation and/or air bubbles. The decision making algorithm may be executed to determine whether the amount of sedimentation and/or air bubbles falls within an acceptable range.

In yet another sample condition example, the image processing system 312 is configured to execute an image recognition algorithm to determine a temperature of the biological sample and/or of the container 200. The decision making algorithm may be executed to determine whether the temperature of the biological sample and/or of the container 200 falls within an acceptable range. Various techniques for determining the temperature may be employed. For example, the determination of the temperature and whether the temperature falls within the acceptable range may be made based on the recognition of a color of a temperature-sensitive color-changing element on the container 200.

In a yet further sample condition example, the one or more characteristics relate to sample history, wherein an image recognition algorithm is executed to obtain information regarding the sample history from the information carrier 202 on the container 200. By "information carrier" is meant any visual indicator attached to or integrated with the container 200 such as a handwritten or printed label or the like, a biometric identifier, an illuminating element, a barcode, and so on. Further examples will be apparent to the person skilled in the art. The information carried by the information carrier 202 may simply comprise a timestamp. The information carrier 202 may comprise an element having at least one property e.g. color which changes over time, to indicate for example the age of the sample and/or its transport time. The decision making algorithm may determine whether the age and/or transport time falls within an acceptable range.

A further possible use of the images 400 captured by the image capturing unit 108 involves the application of image processing techniques to determine the condition of the container 200.

In one example, an image recognition algorithm may be executed to identify, via one or more geometric characteristics of the container 200, a type of the container 200. The decision making algorithm may then be executed to determine the presence or absence of a required type of container 200.

In another example, an image recognition algorithm may be executed to identify, via one or more geometric characteristics of the container 200, one or more components of the container 200, or one or more components for holding or transporting the container 200. The decision making algorithm may then be executed to determine the presence or absence of one or more required components. Additionally or alternatively, the decision making algorithm may then be executed to determine the presence or absence of one or more permissible or impermissible combinations of components.

In a further example, an image recognition algorithm is executed to identify faults in the container 200 or in one of its components. The decision making algorithm may then be executed to select the appropriate action to be taken.

Any such determination of the identity or condition of the sample and/or its container may be used to perform gate control in the manner described above. In particular, gate control may be performed in response to any or more of: failed identification (i.e. an unidentified or falsely identified sample or container; an unexpected identity associated with the sample or container); unacceptable sample condition (i.e. one or more quantities describing the sample condition falling outside a respective acceptable range, i.e. the amount of the biological sample; the amount of visible sedimentation and/or air bubbles; the temperature of the sample; and the age and/or transport time of the sample); unacceptable container condition (i.e. false container type; faulty container; missing or faulty container components; impermissible combinations of container components; the temperature of the container being outside a respective acceptable range).

A yet further possible use of the images 400 involves the application of image processing techniques to perform process monitoring and control at the analyzer 100. To this end, one or more image recognition algorithms may be executed to monitor one or more process or sample parameters during the analysis of the biological sample performed by the analyzer 100. In these examples, the image capturing unit 308 or another image capturing unit may be positioned to capture images of the samples and/or containers during the analysis itself.

In one example, an image recognition algorithm is executed to monitor a mixing process by recognizing movement of the container 200 or of a component of the container 200 in a series of captured images 400. In particular, the image recognition algorithm may be configured to detect a mixing anomaly by correlating the recognized movement to data defining movements or actuations of an agitator used during the mixing process. Various techniques for recognising movement of the container 200 or components thereof are envisaged by the present disclosure. For example, the image recognition algorithm may be configured to recognize movement of the container 200 or of the component of the container 200 via a pattern on the container 200 or component that visually shifts appearance when vibrating.

In another example, an image recognition algorithm is executed to detect detachment of the container 200 from the sample handler 102 or from any other container holder before or during the analysis, and/or to detect detachment of one or more components of the container 200 from the container 200 before or during the analysis.

In a further example, an image recognition algorithm is executed to detect inadvertent replacement of the container 200 by comparing two or more captured images 400 depicting the container 200 before, during, or after the analysis, and recognizing one or more unique identifiers of the container 200 in each image 400.

In a yet further example, an image recognition algorithm is executed to detect shock applied to the container 200 by comparing two or more captured images 400 depicting the container 200 before, during, or after the analysis, and recognizing a velocity or acceleration of movement of the container 200 exceeding a predetermined threshold.

In any of the above-described process monitoring examples (as with the gate control examples described herein), the decision making algorithm may be executed to apply one or more process monitoring rules and, based thereon, to generate the process control signals for use by the control unit 308 in controlling various processes, operations and functions of the analyzer 100.

Figure 6:
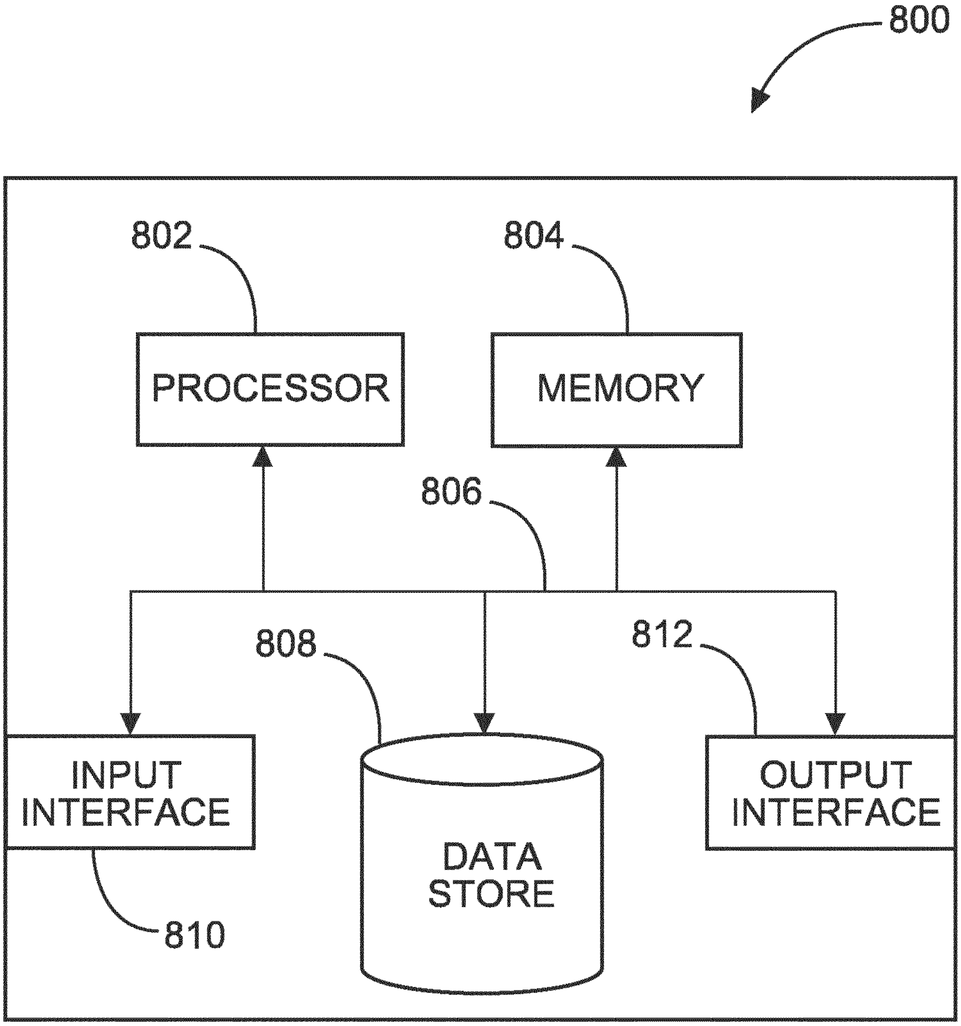
FIG. 6 illustrates a computing device that can be used in accordance with the systems and methods disclosed herein.

Referring now to FIG. 6, a high-level illustration of an exemplary computing device 800 that can be used in accordance with the systems and methodologies disclosed herein is illustrated. In particular, the computing device 800 may be used to implement any one or more of the control unit 308, the image processing system 312 and/or its components, and the remote computing device 318. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data storage 808 that is accessible by the processor 802 by way of the system bus 806. The data storage 808 may include executable instructions, log data, etc.

The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812. It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed and optionally also written to by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

As used herein, "biological sample" refers to any biological sample, whether solid, liquid, gas, or any combination thereof, that may be collected for the purposes of analysis and of which images may be captured. Examples of biological samples may thus include solid samples and fluid samples, such as liquid samples (such as a body liquid, i.e. a physiological liquid) and/or gas samples (e.g. a medical gas, such as a physiological gas). Examples of solid biological samples include stool, earwax, hair, fingernails, skin cells, a tissue sample, tissue obtained from a throat swab, biopsy tissue, microbiota, meconium, and so on. Examples of liquid biological samples include blood, diluted or undiluted whole blood, serum, plasma, saliva, sputum, urine, cerebrospinal fluid, pleura, synovial liquid, ascites liquid, peritoneal liquid, amniotic fluid, breast milk, dialysis liquid samples, gastric fluid, digestive fluid, tears, semen, vaginal fluid, interstitial fluid, fluid derived from tumorous tissue, ocular fluid, sweat, mucus, glandular secretions, placental fluid, lymphatic fluid, cavity fluids, pus, fluid obtained from a nasal swab, fluid obtained from a nasopharyngeal wash, and so on. Examples of gaseous biological samples may include respirator gas, expiratory air, or the like. It will be appreciated that the biological sample may include any quality control materials and calibration substances used by the analyzer for measuring properties of the sample. The sample may be treated prior to analysis in order to make it more amenable to being tested. Pretreatment methods may include dilution, filtration, concentration, extraction, removal or inactivation of components which might interfere with the results, and addition of reagents. Accordingly, image processing techniques as described herein may be applied to perform monitoring and control of such pretreatment methods or sample preparations prior to analysis of the biological samples at a biological sample analyzer.

By "container" is meant anything into which the biological sample can be put for storage or transportation, and may comprise any appropriate holder, receptacle, or vessel such as a syringe, vacutainer, or capillary tube for blood samples. It will be understood that the container, as well as the sample handler and analyzer, may include adaptations corresponding to the nature of the biological sample. For example, for liquid biological samples, the container/handler/analyzer may comprise a liquid handling system comprising valves, conduits, pumps or other transfer means for controlling liquid flow, such as for filling and emptying of the container or measurement chamber 514.

As used herein, the term "image capturing unit" may apply to any electromagnetic spectrum detecting device capable of capturing images. The image capturing unit may be capable of capturing electromagnetic emissions and generating an image along one or more of: a visible spectrum, an infra-red spectrum, an ultra-violet spectrum, or a gamma spectrum. The image capturing unit may comprise a camera, for example a digital camera. The image capturing unit may include a charge coupled device (CCD), photomultiplier, phototube, photodetector or other detection device such as a scanning microscope. In some instances, the cameras may use a CCD, CMOS, may be a lensless (computational) camera (e.g., Frankencamera), an open-source camera, or may use any other visual detection technology known or later developed in the art. The camera may include one or more feature that may focus the camera during use, or may capture images that can be later focused. In some embodiments, the image capturing unit may employ 2D imaging or 3D imaging using for example a time-of-flight depth sensor or a structured light depth sensing technique. The image capturing unit may capture static images. The static images may be captured at one or more points in time. The image capturing unit may also capture video and/or dynamic images. The video images may be captured continuously over one or more periods of time. The image capturing unit may comprise, for example, a spectrophotometer, a PMT, a photodiode, or a non-optical sensor. In some embodiments, the image capturing unit may comprise both a light source and optical sensor. Multiple image capture devices may be used to capture different angles or views of the sample and/or the container. The image capturing unit may be referred to as an image capture device, an imaging device, or equivalent.

By "unit" is meant herein any module, system, subsystem, circuitry, component, or tool for performing the stated functions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

While the invention has been illustrated and described in detail in the drawings and foregoing description, such illustration and description are to be considered exemplary and not restrictive. The invention is not limited to the disclosed embodiments.

Other variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used advantageously. A computer program may be stored/distributed on a suitable medium, such as an optical storage medium or a solid-state medium supplied together with or as part of other hardware, but may also be distributed in other forms, such as via the internet or other wired or wireless communications systems. Any reference signs in the claims should not be construed as limiting the scope.

The invention claimed is:

1. An image processing system configured to:

receive at least one captured image depicting:
- a) at least a portion of a biological sample,
- b) at least a portion of a container containing the biological sample, or
- both a) and b);

process the received image to identify one or more characteristics of
- i) the biological sample,
- ii) the container, or
- both i) and ii); and output signals based on the identified one or more characteristics for result handling, wherein the one or more characteristics comprise a pre-analytic sample condition of the biological sample, wherein the result handling comprises gate control, and wherein the signals output by the image processing system based on the identified one or more characteristics comprise signals for implementing the gate control at a biological sample analyzer;

wherein the signals for implementing the gate control at the biological sample analyzer comprise signals which convey instructions to the biological sample analyzer that a yet to be started analysis is to be prevented;

wherein preventing the yet to be started analysis comprises physically locking out or ejecting the container with an actuator of the biological sample analyzer;

wherein the container comprises a temperature sensitive color changing element, and wherein the identified one or more characteristics comprise a temperature of the biological sample.

2. The image processing system of claim 1, wherein the one or more characteristics comprise a unique ID of the container containing the biological sample.

3. The image processing system of claim 1, configured to identify a plurality of characteristics of the container which, when combined, uniquely identify the container.

4. The image processing system of claim 1, wherein processing the received image to identify the one or more characteristics comprising the pre-analytic sample condition of the biological sample comprises detecting one or more sample handling errors.

5. The image processing system of claim 1, wherein the processing circuitry is configured to execute an image recognition algorithm to identify faults in the container or in one of its components.

6. A server comprising the image processing system of claim 1.

7. A biological sample analyzer comprising the image processing system of claim 1.

8. The biological sample analyzer of claim 7, further comprising one or more of:
- a sample handler;
- a measurement module configured to measure a parameter of the biological sample;
- a display configured to display the measured parameter of the biological sample; and
- an image capture device configured to capture the image.

9. A biological sample handler comprising the image processing system of claim 1.

10. The biological sample handler of claim 9, further comprising an image capture device configured to capture the image.

11. An image processing method comprising:

receiving a captured image depicting:
- a) at least a portion of a biological sample,
- b) at least a portion of a container containing the biological sample, or
- both a) and b);

processing the received image to identify one or more characteristics of:
- i) the biological sample,
- ii) the container, or
- both i) and ii);

outputting signals based on the identified one or more characteristics for result handling, wherein the one or more characteristics comprise a pre-analytic sample condition of the biological sample;

receiving one or more additional images, each of the one or more additional images depicting at least a component of the container;

processing the one or more additional images to identify movement of the container during processing of the biological sample by a biological sample analyzer;

receiving process data, the process data defining movement or actuations of an agitator of the biological sample analyzer during a mixing process; and evaluating the mixing process by correlating the movement of the container to the process data defining movement or actuations of the agitator of the biological sample analyzer.

12. A computing device comprising a processor configured to perform the method of claim 11.

13. A non-transitory computer-readable medium comprising instructions which, when executed by a computing device, cause the computing device to perform the method of claim 11.

* * * * *